United States Patent [19]
Silverman

[11] Patent Number: 6,058,887
[45] Date of Patent: May 9, 2000

[54] CAT AMUSEMENT DEVICE

[76] Inventor: Bruce Silverman, 4180 N. Marine Dr., #211, Chicago, Ill. 60613

[21] Appl. No.: 09/186,821

[22] Filed: Nov. 5, 1998

[51] Int. Cl.⁷ .......................... A01K 13/00; A01K 29/00
[52] U.S. Cl. .......................... 119/609; 119/706; 119/707
[58] Field of Search .................................. 119/609, 706, 119/707, 711, 627, 663, 664

[56] References Cited

U.S. PATENT DOCUMENTS

| | | | |
|---|---|---|---|
| 2,096,078 | 10/1937 | Windson . | |
| 3,874,102 | 4/1975 | Sheppard | 40/426 |
| 4,517,922 | 5/1985 | Lind | 119/708 |
| 5,103,770 | 4/1992 | Berkovich | 119/708 |
| 5,119,001 | 6/1992 | Moore et al. | 318/257 |
| 5,184,568 | 2/1993 | Healey . | |
| 5,269,261 | 12/1993 | McCance . | |
| 5,517,945 | 5/1996 | Udelle . | |
| 5,572,955 | 11/1996 | Boshears . | |
| 5,575,241 | 11/1996 | Line | 119/708 |
| 5,595,141 | 1/1997 | Udelle et al. | 119/706 |
| 5,634,435 | 6/1997 | Udelle et al. . | |
| 5,680,831 | 10/1997 | Udelle . | |
| 5,875,736 | 3/1999 | Udelle et al. | 119/706 |
| 5,875,737 | 3/1999 | Boshears | 119/706 |

Primary Examiner—Peter M. Poon
Assistant Examiner—Yvonne R. Abbott

[57] ABSTRACT

A cat amusement device (10) has a base (12) which has at least one base side (12S), a base top (12T) and a base bottom (12B). The cat amusement device (10) further has at least one microchip (18) contained within the base (12) or post (14). The cat amusement device (10) further has a power means electrically connected to the at least one microchip (18). The cat amusement device (10) at least one microchip (18) is audio capable. The cat amusement device (10) further has at least one speaker (26) electrically connected to the at least one microchip (18) functioning to transmit preselected audio sounds from the at least one microchip (18). The cat amusement device (10) further has at least one arm (16) connected to the motor (22). The at least one arm (16) has an arm holder (16A) at a distal end connectable to a toy (32). The toy (32) is selected to be attractive to a cat. The toy (32) may be feathered to resemble a bird. The toy (32) further may be furry to represent an animal. The at least one microchip (18) has preselected sounds which are emitted from at least one speaker (26). When a cat is detected by the at least one motion detector (24), an electrical signal is transmitted to the at least one microchip (18) which activates the motor (22) rotating the at least one arm (16) having the toy (32) attached at the distal end thereof.

15 Claims, 2 Drawing Sheets

CAT AMUSEMENT DEVICE

BACKGROUND OF THE INVENTION

1. Field of the Invention

The present invention relates to animal toys and devices. More particularly, the present invention relates to powered toys for cats.

2. Description of the Prior Art

Pets are often left alone for hours while their masters are at work. Many devices exist which attempt to entertain pets. The known devices include endless tracks along which a ball or other device is propelled by an animal. Other devices are suspended and move when touched by the animal. The prior art devices lack spontaneity. What is needed is a device that is spontaneous when the pet is within a preselected distance.

Numerous innovations for cat amusement devices have been provided in the prior art that are described as follows. Even though these innovations may be suitable for the specific individual purposes to which they address, they differ from the present invention as hereinafter contrasted.

In U.S. Pat. No. 5,680,831, titled Combined Mechanically Assisted Animal Exercise Device, invented by Steven D. Udelle, a device is described that provides a combination of uses for animals comprising a grooming brush body having bristles affixed thereto. An upper surface contains a claw scratching surface that is affixed to the surface. Track ring assembly includes a lower surface, an inside peripheral sidewall and an angled outside peripheral sidewall which houses a freely movable ball therein. A motor assembly rotates a mushroom-shaped brush body that simultaneously grooms the top and side of an animal's coat. The animal simply presses its body against the rotating brush for effective self-grooming.

The patented invention differs from the present invention because the patented invention is a device having a proximity detector which enables the action of the invention. A grooming action is enabled when an animal approaches the device. A motor causes a brush to begin oscillating. Additionally a toy is caused to rotate within a track via mutual magnetic attraction between a magnet on the toy and the end of a rotating arm driven by the motor. The present invention has a base which is securely attached to a vertical post. A rotating arm is attached, at an inner end, to the top of the post. A suspension means is rotationally attached to the outer end of the rotating arm. A cat toy is attached to the suspension means. A power means is attached to the inner end of the rotating arm, functioning to cause the rotating arm to revolve. A motion detector senses the proximity of an animal to the present invention and enables the power means.

In U.S. Pat. No. 5,634,435, titled Animal Amusement and Exercise Stimulator, invented by Steven D. Udelle, and Laura L. Udelle, an animal amusement and exercise stimulator comprising a circular housing, containing a closed circuit trough around its outermost perimeter. The trough is inclined upwards from the concealed portion to exposed portion and confines a movable object within. A motorized mechanism is concealed within the housing and is comprised of a motor, motor output shaft, propulsion arm including a paddle, and a plurality of actuating arms, employed for operating the motor reversing switch.

The patented invention differs from the present invention because the patented invention is a device having a proximity detector which enables the action of the invention. A motor causes a toy to rotate within a track via mutual magnetic attraction between a magnet on the toy and the end of a rotating arm driven by the motor. The track is partially obscured by a covering. The present invention has a base which is securely attached to a vertical post. A rotating arm is attached, at an inner end, to the top of the post. A suspension means is rotationally attached to the outer end of the rotating arm. A cat toy is attached to the suspension means. A power means is attached to the inner end of the rotating arm, functioning to cause the rotating arm to revolve. A motion detector senses the proximity of an animal to the present invention and enables the power means.

In U.S. Pat. No. 5,572,955, titled Animal Amusement and Exercising Device, invented by Ricky L. Boshears, an animal amusement and exercise device comprises an annular body having spaced apart, overlying flanges forming a laterally open, endless track for the accommodation of a freely rotatable ball. The body defines a cavity in which a compressible pad of material removably may be accommodated. Each of the devices includes connectors for removably coupling such devices with another like device in vertically stacked relation. The track of each device is accessible from outside each device thereby enabling one or more animals to have access to all of the tracks.

The patented invention differs from the present invention because the patented invention is an endless track for the accommodation of a captive freely rotatable ball. The ball is moved by the action of the animal. The patented invention lacks features similar to the present invention.

In U.S. Pat. No. 5,517,945, titled Combined Mechanically Assisted Animal Amusement, grooming, and claw scratching device, invented by Steven D. Udelle, a combined mechanically assisted animal exercise, amusement, self grooming, and claw scratching stimulator, comprising a circular housing, a carpeted platform surface, and a lure ring comprised of a closed circuit U-shaped trough which is partially open thereby exposing the interior. A movable ball-shaped lure containing a permanent magnet is confined within the U-shaped trough. A motorized mechanism concealed within the housing includes a motor, an output shaft, and a magnetic sweep arm mounted to the shaft that rotates at a predetermined speed. An accessory lure, affixed to a spring the top of the brush surface provides an additional source of amusement for an animal.

The patented invention differs from the present invention because the patented invention is a device having a proximity detector which enables the action of the invention. A motor causes a toy to rotate within a track via mutual magnetic attraction between a magnet on the toy and the end of a rotating arm driven by the motor. The track is partially obscured by a covering. The present invention has a base which is securely attached to a vertical post. A rotating arm is attached, at an inner end, to the top of the post. A suspension means is rotationally attached to the outer end of the rotating arm. A cat toy is attached to the suspension means. A power means is attached to the inner end of the rotating arm, functioning to cause the rotating arm to revolve. A motion detector senses the proximity of an animal to the present invention and enables the power means.

In U.S. Pat. No. 5,269,261, titled Animal Scratching Pad and Amusement Device, invented by Donald A. McCance, an animal scratching pad and amusement device is described. The device includes a continuous track and a ball which are movable within and around the track. A receptacle has an open top for receiving a removable and replaceable scratch pad.

The patented invention differs from the present invention because the patented invention is a continuous track and a ball which are movable within and around the track. A receptacle has an open top for receiving a removable and replaceable scratch pad. The patented invention is not motorized and lacks a proximity detector.

In U.S. Pat. No. 5,184,568, titled Cat Scratching Housing and Bed Apparatus, invented by James M. Healey, a housing structure arranged to afford a scratching surface for cats simulates household furniture. The invention includes a litter tray slidably mounted from within the housing and optionally the use of an observation plate accessible by the cat to an upper distal end of the housing structure.

The patented invention differs from the present invention because the patented invention is a housing structure arranged to afford a scratching surface for cats simulating household furniture. The patented invention lacks features similar to the present invention.

Numerous innovations for a cat amusement device have been provided in the prior art that are adapted to be used. Even though these innovations may be suitable for the specific individual purposes to which they address, they would not be suitable for the purposes of the present invention as heretofore described.

SUMMARY OF THE INVENTION

The present invention is an animal amusement device. The present invention has a base which is securely attached to a vertical post. A rotating arm is attached, at an inner end, to the top of the post. A suspension means is rotationally attached to the outer end of the rotating arm. A cat toy is attached to the suspension means. A power means is attached to the inner end of the rotating arm, functioning to cause the rotating arm to revolve. A motion detector senses the proximity of an animal to the present invention and enables the power means.

The types of problems encountered in the prior art are entertaining pets.

In the prior art, unsuccessful attempts to solve this problem were attempted namely: devices which contain moving items functioning to stimulate play from a pet. The play is initiated by the pet or pet owner and is not spontaneous. However, the problem was solved by the present invention because a proximity detector activates a toy when an owner or pet approached within a preselected distance.

The present invention went contrary to the teaching of the art, which is passive, by providing a spontaneous starting means.

The present invention solved a long felt need for a pet amusement device which would entertain a cat.

The present invention provides a way for cats to get more frequent exercise and thus be more healthy.

Accordingly, it is an object of the present invention to provide a spontaneous, self starting device which stimulates a cat into play.

More particularly, it is an object of the present invention to provide a proximity detector which when tripped initiates the movement of a toy.

In keeping with these objects, and with others which will become apparent hereinafter, one feature of the present invention resides, briefly stated, in a motor driven toy.

When the cat amusement center is designed in accordance with the present invention, cats are presented with a moving toy similar to prey.

In accordance with another feature of the present invention, a base is provided.

Another feature of the present invention is that the base, has base side, base top and base bottom.

Yet another feature of the present invention is that a vertical post is supported by the base.

Still another feature of the present invention is that the post has first post and a second post which are telescopically joined.

Yet still another feature of the present invention is that the first post and a second post are releasably attached by a first post fastener.

Still yet another feature of the present invention is that an arm has an arm holder and an arm adjuster.

Another feature of the present invention is that the base contains a microchip, battery and motor.

Yet another feature of the present invention is that the motor has a gear box.

Still another feature of the present invention is that a motion detector is electrically connected to the microchip.

Yet still another feature of the present invention is that a microchip is preprogramed with prey sounds.

Still yet another feature of the present invention is that an ON/OFF speed control switch controls electrical power to the motor, micro chip and proximity switch.

Another feature of the present invention is that the base and post are covered with carpeting.

Yet another feature of the present invention is that a toy attached to the end of the arm simulates prey.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10—cat amusement device (10)
12—base (12)
12S—base side (12S)
12T—base top (12T)
12B—base bottom (12B)
14—post (14)
14A—first post (14A)
14AA—first post fastener (14AA)
14B—second post (14B)
16—arm (16)
16A—arm holder (16A)
16B—arm adjuster (16B)
18—microchip (18)
20—battery (20)
22—motor (22)
22A—motor gear box (22A)
22B—motor arm connector (22B)
24—motion detector (24)
26—speaker (26)
28—ON/OFF speed control switch (28)
30—carpeting (30)
32—toy (32)
34—second post (34)
36—ridge like protrusions (36)
38—arm(38)

40—arm holder (40)
42—toy (42)
44—hole (44)

DESCRIPTION OF THE PREFERRED EMBODIMENT

Figure 1:
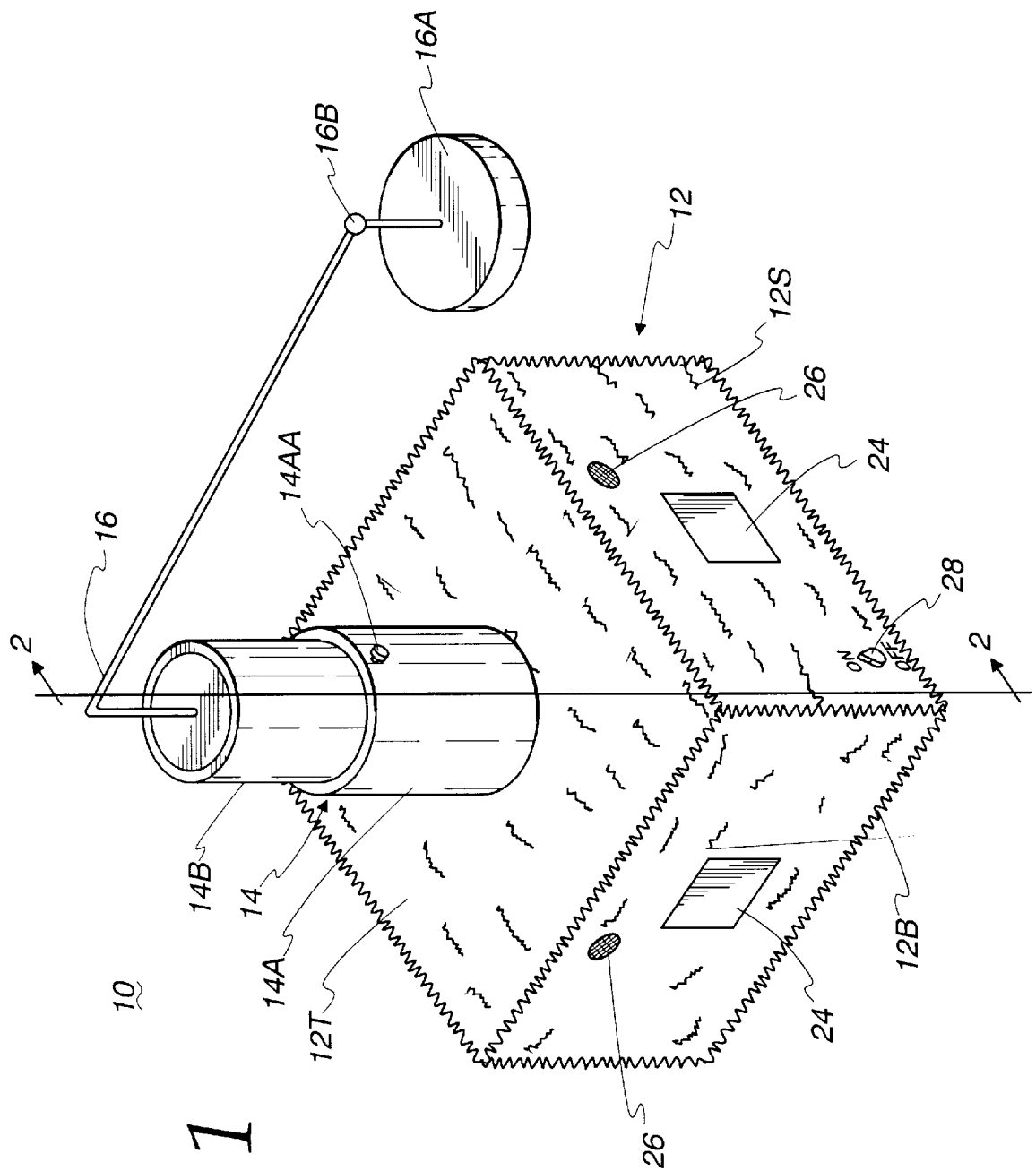
FIG. 1 is a top perspective view of a cat amusement device.

First, referring to FIG. 1 which is a top perspective view of a cat amusement device (10) which comprises a base (12). The base (12) comprises at least one base side (12S), a base top (12T) and a base bottom (12B). The cat amusement device (10) further comprises a post (14) securely attached to the base top (12T) extending upwardly therefrom. The post (14) comprises a first post (14A) and a second post (14B). The base (12) functions to support the post (14). The first post (14A) comprises a slightly larger diameter than the second post (14B) which slidably mounts therein. The first post (14A) comprises a first post fastener (14AA) functioning to secure the first post (14A) to the second post (14B) at various height levels.

The base (12) and post (14) are constructed from a material selected from a group consisting of plastic, plastic composite, fiberglass, epoxy, carbon-graphite, metal, metal alloy, wood, and wood composite. The base (12) and the post (14) may be covered in carpeting (30) functioning to provide a scatchable soft surface.

The cat amusement device (10) further comprises at least one speaker (26) functioning to transmit preselected audio sounds. A power means is contained within the base (12) or post (14). The power means is at least one battery (20). The cat amusement device (10) further comprises an ON/OFF speed control switch (28) which functions as both an ON/OFF switch and an arm (16) rotational speed control.

The cat amusement device (10) further comprises at least one arm (16) connected to the motor (22) extending upwardly and outwardly from the post (14), each of the at least one arm (16) comprise an arm holder (16A) at a distal end connectable to a toy (32). The toy (32) is selected to be attractive to a cat. The toy (32) may be feathered to resemble a bird. The toy (32) further may be furry to represent an animal.

The arm (16) comprises two members having an arm adjuster (16B) therebetween. The arm adjuster (16B) functions to allow angular positioning of the toy (32). The cat amusement device (10) motor (22) further comprises a motor arm connector (22B) attached at a bottom end to the motor gear box (22A) and attached at a top end to the arm (16). The arm (16) is manufactured from a material which is deformable yet retains the original shape.

The cat amusement device (10) further comprises at least one motion detector (24). The at least one motion detector (24) is contained within the base (12) or post (14). Although a motion detector is used in the preferred embodiment, any type of detection device capable of sensing an animal in proximity to the cat amusement device (10) could be substituted without departing from the scope of the present invention. Similarly, the detection device could have a time delay feature and still come within the scope of the present invention.

Figure 2:
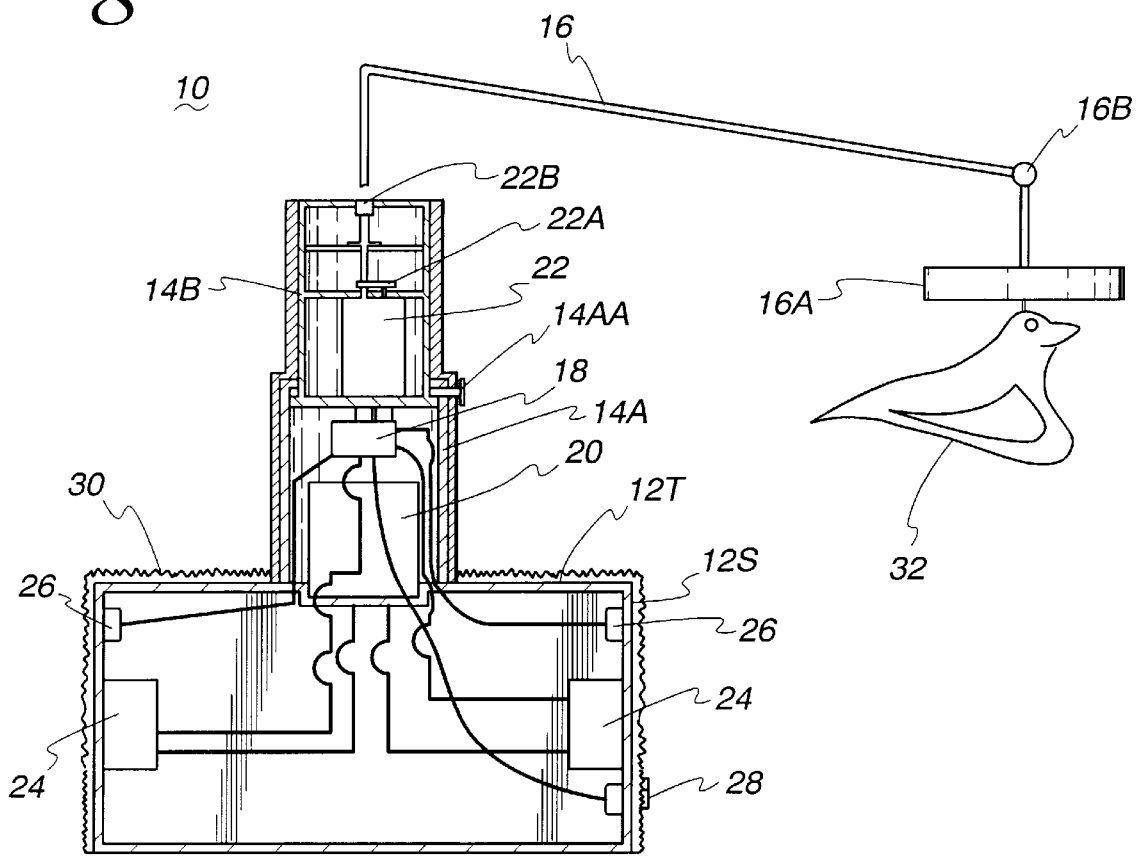
FIG. 2 is a partial cross sectional view of a cat amusement device along line 2—2 of FIG. 1.

Next, referring to FIG. 2 which is a partial cross sectional view of a cat amusement device (10) along line 2—2 of FIG. 1 showing a base (12) which comprises at least one base side (12S), a base top (12T) and a base bottom (12B). The cat amusement device (10) further comprises a post (14) securely attached to the base top (12T) extending upwardly therefrom. The post (14) comprises a first post (14A) and a second post (14B). The base (12) functions to support the post (14). The first post (14A) comprises a slightly larger diameter than the second post (14B) which slidably mounts therein. The first post (14A) comprises a first post fastener (14AA) functioning to secure the first post (14A) to the second post (14B) at various height levels.

The base (12) and post (14) are constructed from a material selected from a group consisting of plastic, plastic composite, fiberglass, epoxy, carbon-graphite, metal, metal alloy, wood, and wood composite. The base (12) and the post (14) may be covered in carpeting (30) functioning to provide a scatchable soft surface.

The cat amusement device (10) further comprises at least one microchip (18) contained within the base (12) or post (14).

The cat amusement device (10) further comprises a power means electrically connected to the at least one microchip (18). The cat amusement device (10) at least one microchip (18) is audio capable. The cat amusement device (10) further comprises at least one speaker (26) electrically connected to the at least one microchip (18) functioning to transmit preselected audio sounds from the at least one microchip (18). The power means is contained within the base (12) or post (14). The power means is at least one battery (20). The cat amusement device (10) further comprises an ON/OFF speed control switch (28) which is electrically connected to the at least one microchip (18). The ON/OFF speed control switch (28) functions as both an ON/OFF switch and an arm (16) rotational speed control.

The cat amusement device (10) further comprises a motor (22) electrically connected to the at least one microchip (18). The motor (22) is contained within the base (12) or post (14). The motor (22) further comprises a motor gear box (22A) connected thereto.

The cat amusement device (10) further comprises at least one arm (16) connected to the motor (22) extending upwardly and outwardly from the post (14), each of the at least one arm (16) comprise an arm holder (16A) at a distal end connectable to a toy (32). The toy (32) is selected to be attractive to a cat. The toy (32) maybe feathered to resemble a bird. The toy (32) further may be furry to represent an animal. The at least one microchip (18) comprises preselected sounds which are emitted from at least one speaker (26). The preselected sounds which are cued to match sounds emitted by the toy (32).

The arm (16) comprises two members having an arm adjuster (16B) therebetween. The arm adjuster (16B) functions to allow angular positioning of the toy (32). The cat amusement device (10) motor (22) further comprises a motor arm connector (22B) attached at a bottom end to the motor gear box (22A) and attached at a top end to the arm (16). The arm (16) is manufactured from a material which is deformable yet retains the original shape.

The cat amusement device (10) further comprises at least one motion detector (24) electrically connected to the at least one microchip (18). The at least one motion detector (24) is contained within the base (12) or post (14). When a cat is detected by the at least one motion detector (24), an electrical signal is transmitted to the at least one microchip

(18) which activates the motor (22) rotating the at least one arm (16) having the toy (32) attached at the distal end thereof The at least one microchip (18) may also send preselected audio sounds to the at least one speaker (26).

Figure 3:
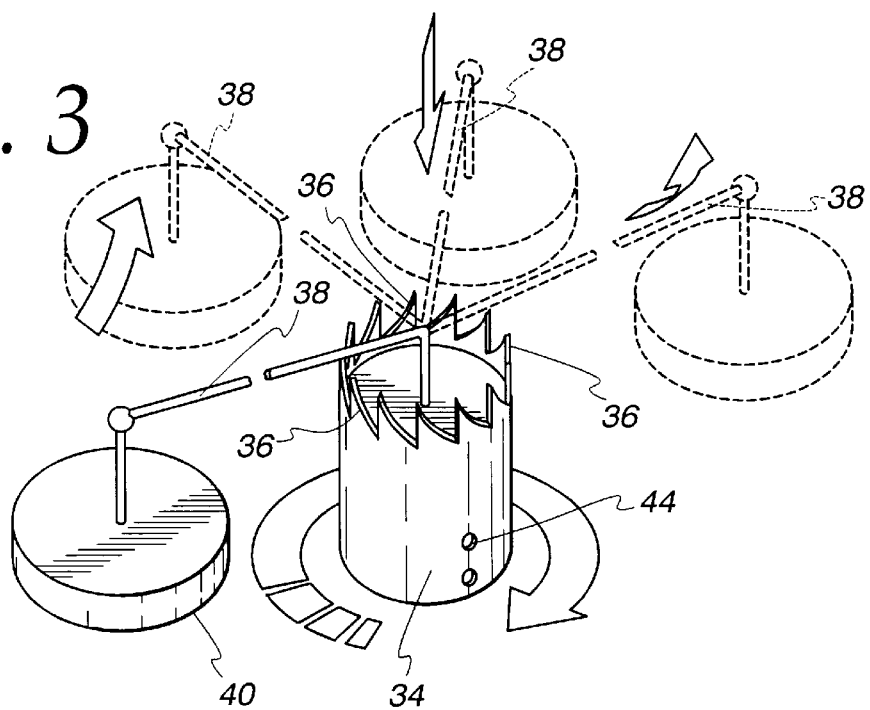
FIG. 3 is an alternative embodiment of the second post (14B) shown in FIGS. 1 and 2.

FIG. 3 shows an alternative embodiment for the second post (34) having multiple ridge like protrusions (36) on its upper portion. These ridge like protrusions (36) cause the arm (38) and arm holder (40) to move up and down in a roller coaster type action, varying the motion of the arm holder (40) and any associated toy, further stimulating the pet. Alternatively, the ridgelike protrusions (36) could be individually adjustable to accomplish the same roller coaster type action without departing in any way from the scope of the present invention.

It will be understood that each of the elements described above, or two or more together, may also find a useful application in other types of constructions differing from the type described above.

While the invention has been illustrated and described as embodied in a cat amusement device, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A cat amusement device (10) comprising:
   A) a base (12) which comprises at least one base side (12S), a base top (12T) and a base bottom (12B);
   B) a post (14) securely attached to the base top (12T) extending upwardly therefrom;
   C) at least one microchip (18) contained within the base (12) or post (14);
   D) a power means electrically connected to the at least one microchip (18), the power means is contained within the base (12) or post (14);
   E) a motor (22) electrically connected to the at least one microchip (18), the motor (22) is contained within the base (12) or post (14);
   F) at least one arm (16) connected to the motor (22) extending upwardly and outwardly from the post (14), each of the at least one arm (16) comprises an arm holder (16A) at a distal end connectable to a toy (32);
   G) at least one detector (24) electrically connected to the at least one microchip (18), the at least one detector (24) is contained within the base (12) or post (14), when a cat is detected by the at least one detector (24), an electrical signal is transmitted to the at least one microchip (18) which activates the motor (22) rotating the at least one arm (16) having the toy (32) attached at the distal end thereof.

2. The cat amusement device (10) as described in claim 1, wherein the base (12) and post (14) are constructed from a material selected from a group consisting of plastic, plastic composite, fiberglass, epoxy, carbon-graphite, metal, metal alloy, wood, and wood composite.

3. The cat amusement device (10) as described in claim 1, wherein the post (14) comprises a first post (14A) and a second post (14B), the first post (14A) comprises a slightly larger diameter than the second post (14B) which slidably mounts therein.

4. The cat amusement device (10) as described in claim 3, wherein the first post (14A) comprises a first post fastener (14AA) functioning to secure the first post (14A) to the second post (14B) at various height levels.

5. The cat amusement device (10) as described in claim 4, wherein the second post (34) has at least one ridge like protrusion (36) on the top surface of said second post (34).

6. The cat amusement device (10) as described in claim 5, wherein the height of said at least one ridge like protrusion (36) is adjustable.

7. The cat amusement device (10) as described in claim 1, wherein the arm (16) comprises two members having an arm adjuster (16B) therebetween, the arm adjuster (16B) functions to allow angular positioning of the toy (32).

8. The cat amusement device (10) as described in claim 1, wherein the power means is at least one battery (20).

9. The cat amusement device (10) as described in claim 1, wherein the motor (22) further comprises a motor gear box (22A) connected thereto.

10. The cat amusement device (10) as described in claim 9, wherein the motor (22) further comprises a motor arm connector (22B) attached at a bottom end to the motor gear box (22A) and attached at a top end to the arm (16).

11. The cat amusement device (10) as described in claim 1, wherein the at least one microchip (18) is audio capable.

12. The cat amusement device (10) as described in claim 11, further comprising at least one speaker (26) electrically connected to the at least one microchip (18).

13. The cat amusement device (10) as described in claim 1, further comprising an ON/OFF speed control switch (28) electrically connected to the at least one microchip (18), the ON/OFF speed control switch (28) functions as both an ON/OFF switch and an arm (16) rotational speed control.

14. The cat amusement device (10) as described in claim 1, wherein the base (12) further comprises carpeting (30) thereover.

15. The cat amusement device (10) as described in claim 1, wherein the post (14) further comprises carpeting (30) thereover.

* * * * *